(12) United States Patent
Siray et al.

(10) Patent No.: US 6,395,247 B1
(45) Date of Patent: May 28, 2002

(54) PRECIPITATED SILICA

(75) Inventors: Mustafa Siray, Bonn; Jochen Scheffler, Alzenau, both of (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/208,454

(22) Filed: Dec. 10, 1998

Related U.S. Application Data

(60) Provisional application No. 60/070,191, filed on Dec. 30, 1997.

(30) Foreign Application Priority Data

Dec. 12, 1997 (DE) .......................... 197 55 287

(51) Int. Cl.$^7$ .......................... C01B 33/18; C01B 33/12
(52) U.S. Cl. .................. 423/335; 423/339; 106/272; 106/482; 106/312
(58) Field of Search ................ 423/339, 335; 106/272, 482, 312

(56) References Cited

U.S. PATENT DOCUMENTS

| | | | | |
|---|---|---|---|---|
| 3,816,154 A | * | 6/1974 | Baldyga | 106/272 |
| 4,001,379 A | | 1/1977 | Turk | 423/339 |
| 4,038,224 A | | 7/1977 | Eisenmenger | |
| 4,312,845 A | * | 1/1982 | Wason | 423/339 |
| 4,495,167 A | | 1/1985 | Nauroth | 423/339 |
| 4,979,684 A | * | 12/1990 | Hock et al. | 241/39 |
| 5,034,207 A | | 7/1991 | Kerner | 423/335 |
| 5,123,964 A | | 6/1992 | Kerner | 423/339 |
| 5,326,395 A | * | 7/1994 | Aldcroft et al. | |
| 5,413,795 A | * | 5/1995 | Lee et al. | |
| 6,039,275 A | * | 3/2000 | Slangen et al. | 241/17 |

FOREIGN PATENT DOCUMENTS

| | | |
|---|---|---|
| DE | 3144299 | 5/1983 |
| DE | 3815670 | 1/1990 |
| EP | 0 076 377 | 4/1983 |
| EP | 0 078 909 | 5/1983 |
| EP | 0 341 383 | 11/1989 |

OTHER PUBLICATIONS

Prospekt 213/3d der Firma Alpine, "Multi–Prozessanlage", Apr. 25, 1996, pp. 1–17.

* cited by examiner

*Primary Examiner*—Ngoc-Yen Nguyen
(74) *Attorney, Agent, or Firm*—Pillsbury Winthrop LLP

(57) ABSTRACT

The precipitated silica has the following physico-chemical parameters:

| | |
|---|---|
| BET surface area (DIN 66131) in m$^2$/g | 400–600 |
| DBP index (DIN 53601) in g/100 g | 300–360 |
| Compacted density (DIN 53194) in g/l | 70–140 |
| Grindometer value (ISO 1524) in μm | 15–50 |
| Size distribution index I | <1.0 | measured with a Malvern instrument

Size distribution index $$I = \frac{d_{90} - d_{10}}{2d_{50}}$$

This precipitated silica is prepared by milling a precipitated silica in accordance with DE-A 31 44 299 in a classifier mill or a fluidized bed counter-flow mill. A polyethylene wax emulsion may be added before the milling procedure. The precipitated silica then has the following physico-chemical parameters:

| | |
|---|---|
| BET surface area (DIN 66131) in m$^2$/g | 351–600 |
| DBP index (DIN 53601) as a % | 300–360 |
| Carbon content as a % | 1–8 |
| Compacted density (DIN 53194) in g/l | 70–140 |
| Grindometer value (ISO 1524) in μm | 15–50 |
| Size distribution index I | <1.0 |

The precipitated silicas may be used as matting agents in lacquer systems.

3 Claims, 2 Drawing Sheets

PRECIPITATED SILICA

CROSS-REFERENCE TO RELATED APPLICATIONS

This application is a continuation of U.S. provisional application, Ser. No. 60/070,191, filed Dec. 30, 1997, and German patent application No. DE 19755287.0, filed Dec. 12, 1997, the entire disclosures of these applications being incorporated herein by reference.

FIELD OF THE INVENTION

The invention relates to a precipitated silica, a process for its preparation and its use as a matting agent.

BACKGROUND OF THE INVENTION

It is known that synthetic, precipitated silicas or silica gels can be used as matting agents (DE-PS 24 14 478, DE-PS 17 67 332, DE-OS 16 69 123, DE-AS 15 92 865, DE-A 38 15 670).

The matting power of a silica depends on a variety of factors, such as, for example, the type of silica, the particle size, the particle size distribution, the refractive index and also the lacquer system. The shape and size distribution of secondary particles in the silica are of particular importance.

In addition to being very efficient, expressed by the reduction in degree of gloss as compared with the non-matted lacquer film, a silica which is used as a matting agent also has to satisfy a number of other requirements. Thus, for example, there should be no undue thickening of the lacquer system due to the silica which is introduced. A smooth surface to the lacquer should be produced on the corresponding thin lacquer coatings. Specks which have an adverse effect on the surface quality must be avoided.

The document DE-A 31 44 299 describes precipitated silicas and a process for preparing these precipitated silicas which are characterized by the following physico-chemical properties:

| | |
|---|---|
| BET surface area according to DIN 66131 in m$^2$/g | 400–600 |
| DBP index according to DIN 53601 as a % | 320–360 |
| and | |
| BET surface area according to DIN 66131 in m$^2$/g | 400–600 |
| DBP index according to DIN 53601 as a % | 310–360 |
| Compacted density according to DIN 53194 in g/l | 75–120 |
| "Alpine" sieve residue > 63 μm in wt. % | <0.1 |

When preparing these silicas, an Alpine transverse flow mill or a jet mill is used to mill the product following spray drying. It is also specified in this document that these precipitated silicas are valuable, highly effective matting agents for lacquers. Precipitated silicas which are prepared using these types of mill lead to disadvantageous roughness of the surface due to the presence of large specks in the final lacquer. The grindometer value (according to ISO 1524) in black stoving enamel is greater than 100 μm and 85 to 90 μm respectively for the known precipitated silicas. Thus these precipitated silicas can only be used to a limited extent as matting agents.

There is now the object of preparing a precipitated silica which does not have these disadvantages.

SUMMARY OF THE INVENTION

The object of the invention is a precipitated silica which is characterized by the following physico-chemical parameters:

| | |
|---|---|
| BET surface area according to DIN 66131 in m$^2$/g | 400–600 |
| DBP index according to DIN 53601 in g/100 g | 300–360 |
| Compacted density according to DIN 53194 in g/l | 70–140 |
| Grindometer value according to ISO 1524 in μm | 15–50 |
| Size distribution index I | <1.0 | measured with a Malvern instrument

Size distribution $$I = \frac{d_{90} - d_{10}}{2d_{50}}$$

Another subject of the invention is a process for preparing precipitated silicas according to the invention with the physical-chemical parameters:

| | |
|---|---|
| BET surface area according to DIN 66131 in m$^2$/g | 400–600 |
| DBP index according to DIN 53601 in g/100 g | 300–360 |
| Compacted density according to DIN 53194 in g/l | 70–140 |
| Grindometer value according to ISO 1524 in μm | 15–50 |
| Size distribution index I | <1.0 | measured with a Malvern instrument

Size distribution index $$I = \frac{d_{90} - d_{10}}{2d_{50}}$$

which is characterized in that a precipitated silica which has the following physico-chemical properties

| | |
|---|---|
| BET surface area according to DIN 66131 in m$^2$/g | 400–600 |
| DBP index according to DIN 53601 as a % | 340–380 |
| Compacted density according to DIN 53194 in g/l | 180–220 |
| "Alpine" sieve residue > 63 μm wt. % | 25–60, | is milled using a classifier mill or a fluidized bed counter-flow mill.

The initial silica is described in the document DE-A 31 44 299.

In one embodiment of the invention, mentioned by way of example, a ZPS classifier mill (Zirkoplex® Alpine Aktiengesellschaft D-8900 Augsburg) or an AFG fluidized bed counter-flow mill may be used.

In another variant of the invention, the precipitated silica according to the invention may be classified after milling in order to adjust to a specific granular fraction. In a preferred embodiment of the invention, the precipitated silica has the size distribution shown in FIG. 1.

Classifying may be performed, for example, using an ATP Turboplex fine classifier (Alpine Aktiengesellschaft D-8900 Augsburg).

The invention also provides a precipitated silica coated with a polyethylene wax emulsion which is characterized by the following physico-chemical parameters:

| | |
|---|---|
| BET surface area according to DIN 66131 in m²/g | 351–600 |
| DBP index according to DIN 53601 as a % | 300–360 |
| Carbon content as a % | 1–8 |
| Compacted density according to DIN 53194 in g/l | 7–140 |
| Grindometer value according to ISO 1524 in μm | 15–50 |
| Size distribution index I | <1.0 |

This precipitated silica can be prepared by adding polyethylene wax emulsion to a precipitated silica which has the following physico-chemical characteristics:

| | |
|---|---|
| BET surface area according to DIN 66131 in m²/g | 400–600 |
| DBP index according to DIN 53601 as a % | 340–380 |
| Compacted density according to DIN 53194 in g/l | 180–220 |
| "Alpine" sieve residue > 63 μm wt. % | 25–60 | and then drying and milling the product using a classifier mill or a fluidized bed counter-flow mill.

In one embodiment of the invention, the precipitated silica can be prepared by liquefying the filter cake under the action of shear forces, adding polyethylene wax emulsion, spray drying and then milling using a classifier mill or a fluidized bed counter-flow mill.

A precipitated silica in accordance with DE-A 31 44 299 is preferably used as the starting silica.

Precipitated silica according to the invention has the following advantages:

The advantages of precipitated silicas according to the invention are in particular their high matting efficiency, in addition to further advantages such as the very smooth surface of the dry lacquer, high transparency and a small effect on the rheology (viscosity) of the lacquer.

DETAILED DESCRIPTION OF THE PREFERRED EMBODIMENTS

Example 1

Figure 1:
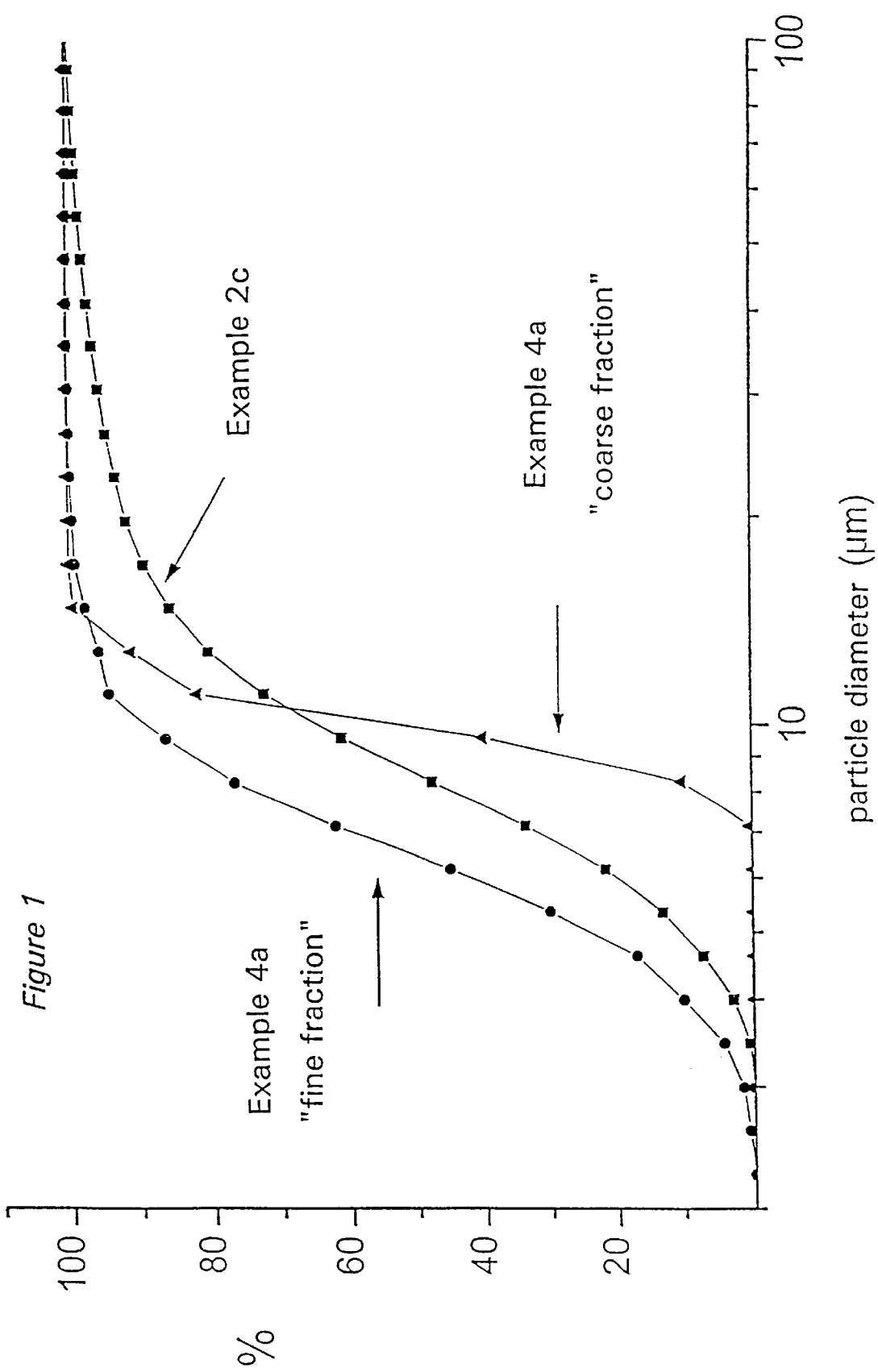
FIG. 1 shows the size distribution of classified precipitated silica.

A precipitated silica prepared in accordance with Example 1 from DE-A 31 44 299 is milled in a ZPS 100 Zirkoplex® classifier mill from the Alpine company, by varying the throughput and the process parameters such as speed of rotation of the classifier, milling throughput and milling air. The trial parameters, the physico-chemical data and the paint properties which are obtained in black stoving lacquer are given in Table 1.

Example 2

A precipitated silica prepared in accordance with Example 1 from DE-A 31 44 299 is milled in an AFG 200/1 fluidized bed counter-flow mill, from the Alpine company, while varying the throughput and the process parameters such as rate of rotation of the classifier, or the milling air. The trial parameters, the physico-chemical data and the paint properties which are obtained in black stoving lacquer are given in Table 2.

Example 3

Precipitated silicas which are prepared in accordance with Example 1c or Example 2c (see Tables 1 and 2) are classified in an ATP 50 turboflex fine classifier to give a finer and a coarser fraction. The process parameters, the physical data and the paint test results which are obtained in black stoving lacquer are given in Table 3.

Example 4 (Comparative Example)

The unmilled, spray-dried silica, prepared in accordance with DE 31 44 299 (Example 6), is milled on a UP 630 Alpine transverse flow mill. The physico-chemical data and paint properties of the product obtained are given in Table 4.

Example 5 (Comparative Example)

The unmilled, spray-dried silica, prepared in accordance with DE 31 44 299 (Example 9), is milled using an MC 500 Microgrinding air jet mill. The physico-chemical data and paint properties are given in Table 4.

The effectiveness and matting efficiency of the precipitated silicas prepared according to Examples 1 to 3 are tested in a black staving lacquer. The Lange gloss values, at angles of reflection of 60° and 85°, and the Hegman grindometer value were also assessed.

The B. Lange gloss meter was used to determine the degree of gloss, which is a measure of the matting power of the matting silica tested. The B. Lange gloss meter uses angles of incidence and reflection of 60° and 85°. The degrees of gloss measured are cited as percentages. The lower this value, the better is the matting capacity of the precipitated silica. As a result, less matting agent has to be used in order to achieve a quite specific degree of gloss or a specified matting effect.

The grindometer value is determined using a grindometer. The grindometer value, which is measured in μm (micrometers) is a measure of the largest particles which can be found after stirring the precipitated silica into the final, sprayable lacquer mixture. It can be related to the production of specks in the dry lacquer film, so undesired specks or sprayed granules can be detected using the grindometer (ISO 1524).

The quality of the lacquer film surface is determined using the scanning section method developed by the Hommelwerke company and is cited as an average roughness value (Ra) according to DIN 4768/1, DIN 4762/1E and as an average depth of roughness (RZD) according to DIN 4768/1.

The black stoving lacquer used had the following composition:

| | Parts by wt |
|---|---|
| Carbon black paste, tack 1 | 8.0 |
| Jägalyd R40, 60% strength in xylene | 50.8 |
| Maprenal MF 800, 55% strength in butanol | 25.9 |
| Baysilone paint additive OL 17, 1% in Xylene | 2.0 |
| | 13.3 |
| Thinner | 100.0 |
| Thinner | |
| Xylene | 75.0 |
| Butanol | 10.0 |

-continued

| | Parts by wt |
|---|---|
| Ethoxypropanol | 15.0 |
| | 100.0 |

4 g of precipitated silica are stirred into 100 g of lacquer with a blade stirrer at 2000 rpm for 10 minutes. The viscosity of the mixture is adjusted to a flow time of 20 seconds using xylene (DIN; 4 mm nozzle)

The lacquer is sprayed to give an approximately 30 μm thick dry layer on sheet metal, air dried and fired at 180° C. for 30 minutes.

Example 6

The paint properties of the precipitated silicas prepared according to examples 1a to c, a precipitated silica prepared according to DE 38 15 670 and a commercially available product (Nipsil 1009) are tested in two other test lacquer systems.

CC lacquer

| | Parts by wt. |
|---|---|
| Alftalat AN 950, 60% in Solvesso 150/Butylglycol | 29.30 |
| Solvesso 150 | 2.60 |
| Titanium dioxide Kronos 2059 | 33.60 |
| Aerosil R 972 | 0.20 |
| Dispersion: 40 h ball mill KU 5, 60 rpm, 4900 g Alubite beads 19 mm | |
| Alftalat AN 950, 60% in Solvesso 150/Butyl glycol | 13.00 |
| Maprenal MF 900, 100% | 8.10 |
| Maprenal MF 577, 50% in butanol | 0.80 |
| Butyl glycol | 2.00 |
| Solvesso 150 | 2.90 |
| Xylene | 6.70 |
| DOW CORNING PA 57 | 0.60 |
| p-Tolylsulfonic acid, 20% in butanol | 0.30 |
| Total | 100.00 |

Before use, 3.2 g of matting agent are dispersed in 150 parts by weight of lacquer using a blade stirrer at 2000 rpm.

DD lacquer

| | Parts by wt. |
|---|---|
| CAB 381-0,5 | 0.3 |
| Butyl acetate, 98% strength | 11.0 |
| Ethoxypropyl acetate | 16.5 |
| Desmophen 800 | 15.0 |
| Desmophen 1100 | 20.0 |
| Mowilit, 50% strength in ethyl acetate | 3.0 |
| Baysilone-lacquer additive | 0.1 |
| Xylene | 34.1 |
| Total | 100.00 |

Firstly 0.3 parts by weight of CAB 381-0.5 are carefully dissolved in 11.0 parts by weight of butyl acetate (98.0% strength) and 16.5 parts by weight of ethoxypropyl acetate using a high speed stirrer. Then the other components are added in the sequence given above and the mixture is homogenized by stirring.

Before use, the gloss lacquer is homogenized with the blade stirrer. The matting agent (amount see table 6) is dispersed in 100 parts by weight of lacquer using a blade stirrer at 2000 rpm. After a degassing time of 15 minutes, 50 g of the hardener Desmodur L 75 are added and homogenized with the blade stirrer for 2 minutes at 1000 rpm. The mixture is applied to a thoroughly pre-cleansed glass block and to a black, high gloss, lacquered glass block using a spreader with a 200 μm slit.

The test results in CC lacquer are given in Table 5 and in DD lacquer in Table 6. For comparison the precipitated silicas according to DE 38 15 670 and the commercial product NIPSIL E 1009 are also given. A comparison of the data determined can be obtained from the tables.

FIG. 1 shows the size distribution of classified precipitated silica of Example 2c of the invention compared with comparative Example 4c, using data set forth in the Tables below.

Figure 2:
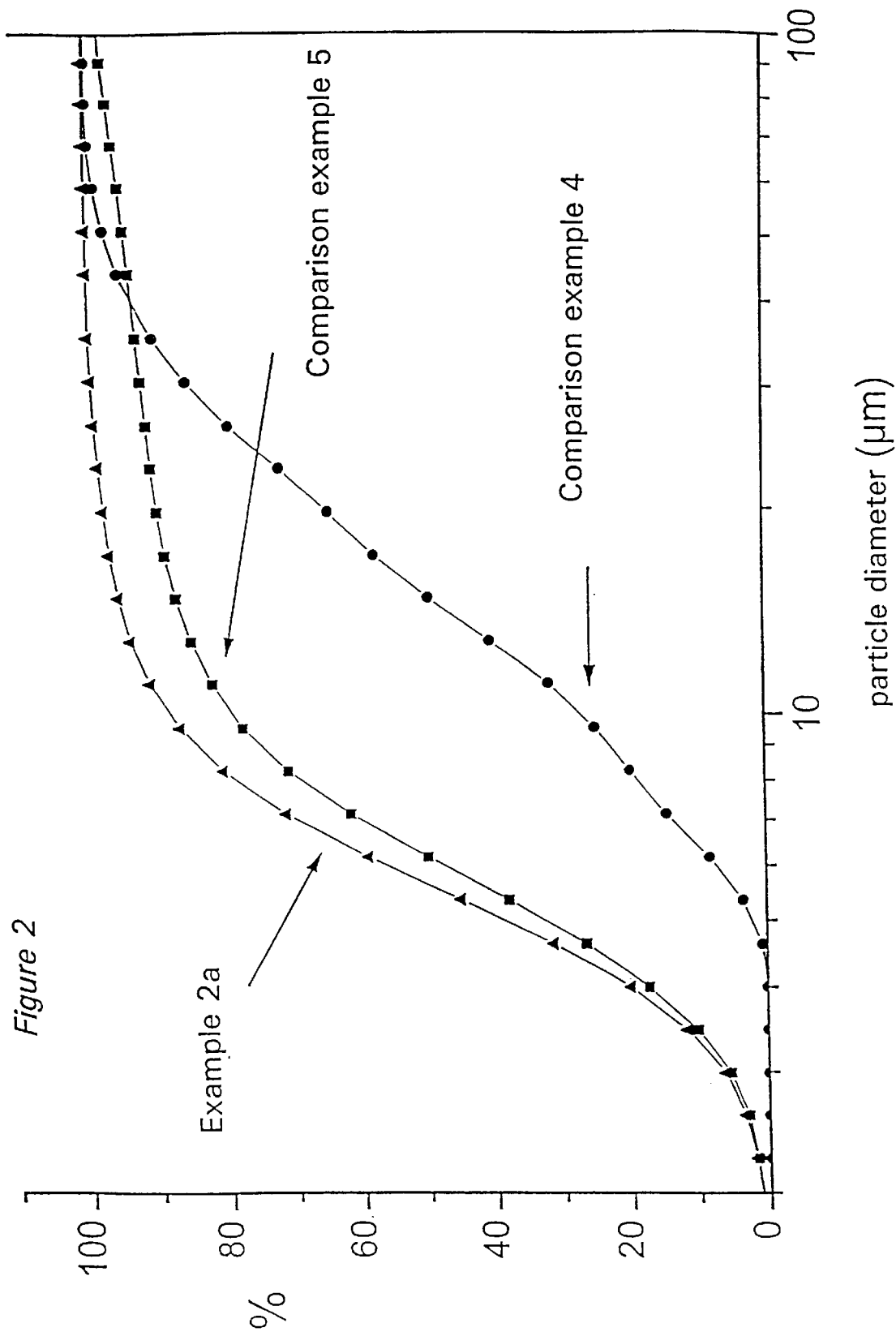
FIG. 2 shows the particle size distribution of precipitated silicas according to the invention compared to the particle size distribution of a precipitated silica in accordance with DE-A 31 44 299.

FIG. 2 shows the particle size distribution of precipitated silica of Example 2 of the invention, compared with the particle size distribution of precipitated silicas of comparative Examples 4 and 5, according to DE 31 44 299, using data set forth in the Tables below.

TABLE 1

| Ex. | Speed of mill rpm | Speed of classifier rpm | Classifier air m³/h | Through-put kg/h | Particle size (Malvern) | | | | Grindo μm | Gloss 60° | 85° | Sheen | Roughness RZD | Ra | Viscosity s | Thickness of coating μm |
|---|---|---|---|---|---|---|---|---|---|---|---|---|---|---|---|---|
| | | | | | d 4.3 | d 10 | d 50 | d 90 | | | | | | | | |
| 1a | 10700 | 11000 | 175 | 10 | 8.34 | 4.48 | 7.03 | 12.89 | 23 | 23.8 | 72.0 | 48.2 | 2.27 | 0.27 | 36 | 30 |
| 1b | 10000 | 10500 | 180 | 15 | 9.76 | 4.53 | 7.11 | 15.84 | 27 | 21.8 | 70.3 | 48.5 | 2.37 | 0.28 | 36 | 30 |
| 1c | 10000 | 9000 | 200 | 30 | 9.34 | 4.52 | 8.03 | 13.87 | 28 | 24.7 | 67.9 | 43.2 | | | 34 | 28 |
| 1d | 10000 | 10000 | 145 | 15 | 9.97 | 4.27 | 6.78 | 16.13 | 33 | 26.0 | 73.4 | 47.4 | | | 38 | 29 |

TABLE 2

| Ex. | Speed of classifier rpm | Milling air m³/h | Through-put kg/h | Particle size (Malvern) micrometers (μm) | | | | Grindo μm | Gloss 60° | Gloss 85° | Sheen | Roughness RZD | Roughness Ra | Viscosity s | Thickness of coating μm |
|---|---|---|---|---|---|---|---|---|---|---|---|---|---|---|---|
| | | | | d 4.3 | d 10 | d 50 | d 90 | | | | | | | | |
| 2a | 11000 | 150 | 20 | 6.49 | 3.74 | 5.95 | 9.7 | 23 | 16.6 | 66.4 | 49.8 | 2.24 | 0.28 | 36 | 40 |
| 2b | 11000 | 150 | 40 | 12.9 | 3.69 | 6.68 | 24.3 | 23 | 21.9 | 58.0 | 36.1 | 2.00 | 0.24 | 39 | 39 |
| 2c | 10000 | 150 | 20 | 11.5 | 4.99 | 8.47 | 17.9 | 27 | 16.6 | 58.8 | 42.2 | 3.24 | 0.42 | | |
| 2d | 8000 | 150 | 30 | 12.2 | 5.76 | 11.5 | 19.5 | 39 | 15.6 | 43.8 | 28.2 | 4.30 | 0.55 | 36 | 42 |
| 2e | 11000 | 150 | 30 | 7.6 | 3.55 | 6.1 | 12.44 | 24 | 21.1 | 55.4 | 34.3 | | | | |

TABLE 3

Classifying precipitated silica, prepared according to example 1c

| Ex. | Fraction | Speed rpm | Classifier air m³/h | Through-put kg/h | Particle size (Malvern) | | | | Grindo μm | Gloss 60° | Gloss 85° | Sheen | Roughness RZD | Roughness Ra | Viscosity s | Thickness of coating μm |
|---|---|---|---|---|---|---|---|---|---|---|---|---|---|---|---|---|
| | | | | | d 4.3 | d 10 | d 50 | d 90 | | | | | | | | |
| 3a | fine | 16000 | 53 | 4.3 | 7.42 | 4.24 | 6.78 | 11.13 | 22 | 25.3 | 75.7 | 50.4 | | | 23 | 30 |
| | coarse | | | | 12.07 | 8.05 | 11.28 | 16.99 | 33 | 12.1 | 27.6 | 15.5 | | | 21 | 30 |
| 3b | fine | 16000 | 66 | 2.0 | 6.84 | 3.95 | 6.30 | 10.11 | 23 | 26.2 | 74.9 | 48.7 | | | 23 | 30 |
| | coarse | | | | 11.18 | 8.26 | 10.93 | 14.45 | 33 | 12.3 | 26.4 | 14.1 | | | 21 | 30 |
| 3c | fine | 13000 | 117 | 6.0 | 7.42 | 4.24 | 6.82 | 11.07 | 22 | 23.1 | 71.9 | 48.8 | 2.13 | 0.26 | 23 | 30 |
| | coarse | | | | 11.08 | 8.03 | 10.73 | 14.48 | 33 | 13.9 | 35.6 | 21.7 | | | 21 | 30 |

Classifying precipitated silica, prepared according to example 2c

| Ex. | Fraction | Yield % | Speed of classifier rpm | Milling air m³/h | Through-put kg/h | Particle size (Malvern) | | | | Grindo μm | Gloss 60° | Gloss 85° | Sheen | Roughness RZD | Roughness Ra | Viscosity s |
|---|---|---|---|---|---|---|---|---|---|---|---|---|---|---|---|---|
| | | | | | | d 4.3 | d 10 | d 50 | d 90 | | | | | | | |
| 4a | fine | 85 | 13000 | | 2.1 | 6.84 | 3.95 | 6.26 | 10.10 | 29 | 19.8 | 70.3 | 50.7 | 2.2 | 0.27 | 26 |
| | coarse | 15 | | | | 10.17 | 8.32 | 9.91 | 12.35 | 29 | 10.9 | 31.2 | 20.3 | | | 24 |
| 4b | fine | 66 | 16000 | | 2.1 | 7.37 | 3.01 | 4.84 | 11.08 | 17 | 21.8 | 77.6 | 55.8 | | | 26 |
| | coarse | 34 | | | | 9.36 | 8.45 | 9.28 | 10.4 | 27 | 10.5 | 36.2 | 25.7 | | | 24 |

TABLE 4

| | Particle size (μm) | | | | Grindo μm | Gloss 60° | Gloss 85° | Sheen |
|---|---|---|---|---|---|---|---|---|
| | d 4.3 | d 10 | d 50 | d 90 | | | | |
| Comparison example 4 | 18.7 | 6.4 | 14.9 | 35.1 | >100 | 10.5 | 15.2 | 4.7 |
| Comparison example 5 | 12.8 | 3.4 | 6.2 | 20.7 | 85 Specks, air bubbles | 18.4 | 62.4 | 44.0 |

TABLE 5

CC lacquer

| Example according to: | DE 38 15 670 | 1 a | 1 b | 1 c | NIPSIL E 1009 |
|---|---|---|---|---|---|
| Flowtime in DIN seconds at 23° C. | 140 | 149 | 148 | 135 | 118 |
| Thickness of coating in μm | 23 | 23 | 24 | 23 | 23 |
| 60° reflectometer value (DIN 67530) | 36.9 | 36.7 | 36.3 | 37.7 | 44.4 |
| 85° reflectometer value (DIN 67530) | 79.3 | 78.9 | 77.7 | 77.5 | 86.5 |
| Sheen | 42.4 | 42.2 | 41.4 | 39.8 | 42.1 |

TABLE 6

DD lacquer

| Example according to: | DE 38 15 670 | 1 a | 1 b | 1 c | NIPSIL E 1009 |
|---|---|---|---|---|---|
| Amount of matting agent added | 7.5 | 7.5 | 7.5 | 7.5 | 7.5 |
| Flowtime in DIN seconds at 23° C. | 31 | 42 | 41 | 32 | 23 |
| 60° reflectometer value (DIN 67530) | 19.5 | 30 | 30.2 | 43.7 | 90.4 |

TABLE 6-continued

DD lacquer

| Example according to: | DE 38 15 670 | 1 a | 1 b | 1 c | NIPSIL E 1009 |
|---|---|---|---|---|---|
| 85° reflectometer value (DIN 67530) | 55.6 | 68.1 | 68.2 | 74.9 | 97.5 |
| Macbeth RD 918 densitometer value measured using yellow filter | 2.12 | 2.31 | 2.17 | 2.16 | 2.3 |

Example 7

The matting efficiency is determined in a number of different lacquer systems, wherein the preparation and application of the lacquer took place under identical conditions each time.

A high matting efficiency means a low requirement (concentration) of matting agent in order to achieve a specific degree of gloss (measured at an angle of 60°. The matting efficiency of unknown matting agents is determined in a relative manner, i.e. by comparison with known matting agents, so that variations in the determination of the degree of gloss (depending on the mode of preparation and application of the lacquer) are avoided. One important physico-chemical parameter which has a critical effect on the matting efficiency of silica is the particle size distribution of the silica. Basically, it has been shown that with identical precipitation processes the matting efficiency of the precipitated silica decreases with decreasing particle size (and vice versa). Fine fractions of precipitated silica have a lower matting efficiency than that of a more coarsely milled fraction.

The high matting efficiency of the precipitated silicas according to the invention is demonstrated as follows, in a variety of lacquer systems:

Table 7: Test in Alkyd/melamine Lacquer
Lacquer System: Alkyd Melamine in Accordance with Formulation Product from example 2c has higher matting efficiency than Syloid ED 5, although this product is more finely divided. Furthermore, product 2a is more efficient than Nipsil 1009 and Syloid ED 3.

| Product prepared according to example | Weight added g | Particle size d 4.3 µm | Particle size d 10 µm | Particle size d 50 µm | Particle size d 90 µm | Grindo-meter µm | Gloss 60° | Gloss 85° | Sheen | RZD rough-ness (A/M) | Ra rough-ness (A/M) | Viscosity s | Thickness of coating µm |
|---|---|---|---|---|---|---|---|---|---|---|---|---|---|
| 1 + 3 | 4 | 12.32 | 6.58 | 11.48 | 18.83 | 32 | 16.0 | 43.0 | 27.0 | 3.43 | 0.46 | 34 | 32 |
| 1 + 3 | 4 | 11.85 | 5.99 | 10.90 | 18.70 | 34 | 16.0 | 46.0 | 30 | | | 37 | 32 |
| 2 | 4 | 12.22 | 5.76 | 11.53 | 19.50 | 40 | 16.4 | 45.0 | 28.6 | 4.30 | 0.55 | 36 | 42 |
| OK 520 | 4 | | | 7.20 | | 31 | 16.5 | 64.0 | 47.5 | 3.05 | 0.36 | 38 | 37 |
| 2 | 4 | 11.50 | 4.99 | 8.47 | 17.97 | 30 | 16.6 | 56.8 | 40.2 | 3.24 | 0.42 | 36 | 38 |
| 2 | 4 | 10.90 | 5.55 | 10.41 | 16.46 | 37 | 16.9 | 47.8 | 30.9 | | | 38 | 27 |
| 1 | 4 | 13.24 | 6.42 | 12.90 | 20.40 | 33 | 17.8 | 43.6 | 25.8 | | | 36 | 30 |
| 1 + 3 | 4 | 12.32 | 6.58 | 11.48 | 18.83 | 33 | 17.9 | 50.2 | 32.3 | 3.43 | 0.46 | 33 | 40 |
| Syloid ED 5 | 4 | 10.47 | 6.30 | 9.56 | 16.82 | 32 | 18.7 | 51.0 | 32.3 | 3.65 | 0.46 | 32 | 41 |
| 1 + 3 | 4 | 8.85 | 4.50 | 8.37 | 13.19 | 25 | 19.8 | 61.9 | 42.1 | 2.80 | 0.35 | 37 | 32 |
| 1 + 3 | 4 | 8.85 | 4.50 | 8.37 | 13.19 | 25 | 21.0 | 63.0 | 42.0 | | | 34 | 40 |
| 1 | 4 | 11.37 | 5.81 | 10.95 | 17.12 | 34 | 21.5 | 55.2 | 33.7 | | | 35 | 28 |
| 1 | 4 | | | 7.10 | | 27 | 21.8 | 70.3 | 48.5 | 2.37 | 0.28 | 36 | |
| Syloid ED 3 | 4 | 6.04 | 3.62 | 5.54 | 8.88 | 21 | 22.0 | 73.0 | 51.0 | 2.03 | 0.24 | 35 | 34 |
| Nipsil E 1009 | 4 | 7.92 | 4.34 | 6.97 | 12.51 | 27 | 22.0 | 70.0 | 48.0 | 2.44 | 0.28 | 38 | 32 |
| OK 607 | 4 | 4.60 | | 4.20 | | 18 | 22.5 | 78.5 | 56.0 | 1.70 | 0.20 | 35 | 32 |
| 2 + 3 | 4 | 6.84 | 3.95 | 6.26 | 10.10 | 22 | 22.9 | 74.6 | 51.7 | 2.20 | 0.27 | 35 | 39 |
| 2 | 4 | 12.47 | 4.03 | 7.17 | 29.37 | 27 | 23.1 | 74.1 | 51.0 | 2.08 | 0.26 | 34 | 41 |
| 1 | 4 | 8.34 | 4.48 | 7.03 | 12.89 | 23 | 23.8 | 72.0 | 48.2 | 2.27 | 0.27 | 36 | 30 |
| 1 | 4 | 10.10 | 5.03 | 7.80 | 14.71 | 23 | 24.1 | 70.7 | 46.6 | | | 36 | 30 |
| 1 | 4 | 8.52 | 4.84 | 7.57 | 12.94 | 23 | 24.4 | 71.0 | 46.6 | | | 38 | 30 |
| 1 | 4 | 9.34 | 4.52 | 8.03 | 13.87 | 28 | 24.7 | 67.9 | 43.2 | | | 34 | 28 |
| 1 + 3 | 4 | 7.42 | 4.24 | 6.82 | 11.07 | 24 | 25.0 | 73.0 | 48.0 | 2.13 | 0.26 | 38 | 34 |

TABLE 8

Tests in DD lacquer

Lacquer system: DD lacquer in accordance with formulation
Comparison example: Syloid ED 3

| Product ref. | Weight added g | Malvern value d 4.3 µm | Particle size d 10 µm | Particle size d 50 µm | Particle size d 90 µm | Grindo-meter (A/M) µm | Densito-meter value | Gloss 60° | Gloss 85° | Sheen | Rough-ness RZD (A/M) | Rough-ness Ra (A/M) | Visco-sity s | Thick-ness of coating µm | Lacquer system |
|---|---|---|---|---|---|---|---|---|---|---|---|---|---|---|---|
| 2b | 7.65 | 12.93 | 3.69 | 6.68 | 24.35 | 25 | 2.11 | 25.0 | 66.2 | 41.2 | 2.00 | 0.24 | n.m. | ca. 40 | DD |
| 2d | 8.00 | 12.22 | 5.76 | 11.53 | 19.50 | 40 | 2.16 | 24.7 | 40.3 | 15.6 | 4.30 | 0.55 | 32 | ca. 40 | DD |
| 3c | 8.2 | 7.42 | 4.24 | 6.82 | 11.07 | 22 | 2.12 | 25.0 | 65.6 | 40.6 | 2.13 | 0.26 | 53 | ca. 40 | DD |

TABLE 8-continued

Tests in DD lacquer

Lacquer system: DD lacquer in accordance with formulation
Comparison example: Syloid ED 3

| Product ref. | Weight added g | Malvern value d 4.3 μm | Particle size d 10 μm | Particle size d 50 μm | Particle size d 90 μm | Grindometer (A/M) μm | Densitometer value | Gloss 60° | Gloss 85° | Sheen | Roughness RZD (A/M) | Roughness Ra (A/M) | Viscosity s | Thickness of coating μm | Lacquer system |
|---|---|---|---|---|---|---|---|---|---|---|---|---|---|---|---|
| 2a | 8.24 | 6.49 | 3.74 | 5.95 | 9.70 | 24 | 2.11 | 24.5 | 59.7 | 35.2 | 2.24 | 0.28 | 55 | ca. 40 | DD |
| 1a | 8.41 | 8.34 | 4.48 | 7.03 | 12.89 | 25 | 2.08 | 25.0 | 60.9 | 35.9 | 2.27 | 0.27 | n.m. | ca. 40 | DD |
| silica | 10.1 | 7.83 | 4.67 | 7.17 | 11.56 | 23 | 2.01 | 25.0 | 61.9 | 36.9 | 1.95 | 0.24 | 53 | ca. 40 | DD |
| Syloid ED 3 | 10.7 | 6.04 | 3.62 | 5.54 | 8.88 | 21 | 2.24 | 25.0 | 68.2 | 43.2 | 2.03 | 0.24 | 52 | ca. 40 | DD |

TABLE 9

Tests in DD lacquer

Lacquer system: DD lacquer in accordance with formulation
Comparison example: Nipsil E 1009

| Product ref. | Weight added g | Particle size d 4.3 μm | Particle size d 10 μm | Particle size d 50 μm | Particle size d 90 μm | Grindometer value μm | Densitometer value | Gloss 60° | Gloss 85° | SheeN | Roughness RZD (A/M) | Roughness Ra (A/M) | Viscosity s | Thickness of layer μm | Lacquer system |
|---|---|---|---|---|---|---|---|---|---|---|---|---|---|---|---|
| 2b | 7.65 | 12.93 | 3.69 | 6.68 | 24.35 | 25 | 2.11 | 25.0 | 66.2 | 41.2 | 2.00 | 0.24 | n.m. | ca. 40 | DD |
| 1a | 8.41 | 8.34 | 4.48 | 7.03 | 12.89 | 25 | 2.08 | 25.0 | 60.9 | 35.9 | 2.27 | 0.27 | n.m. | ca. 40 | DD |
| Nipsil E 1009 | 11.3 | 7.92 | 4.34 | 6.97 | 12.51 | 27 | 1.96 | 25.0 | 60.5 | 35.5 | 2.44 | 0.28 | 35 | ca. 40 | DD |

TABLE 10

Tests in coil coating lacquer

Lacquer system: coil coating lacquer in accordance with formulation

| Product prepared according to example | Weight added g | Particle size d 4.3 μm | Particle size d 10 μm | Particle size d 50 μm | Particle size d 90 μm | Grindometer μm | Gloss 60° | Gloss 85° | Sheen | Viscosity s |
|---|---|---|---|---|---|---|---|---|---|---|
| HK 125 | 2.7 | | 4.9 | 9.65 | 17.35 | 30 | 24.0 | 45.0 | 21.0 | 95 |
| Syloid C 812 | 2 | | 6.40 | 12.50 | 20.80 | 40 | 27.0 | 44.0 | 17.0 | 90 |
| 1 | 2 | 12.36 | 6.20 | 11.33 | 19.31 | 32 | 27.0 | 48.0 | 21.0 | 101 |
| 1 | 2 | 14.56 | 6.82 | 13.31 | 23.30 | 40 | 28.0 | 48.0 | 20.0 | 102 |
| Lovel HSF | 2 | | 6.74 | 13.22 | 22.96 | 44 | 29.0 | 42.0 | 13.0 | 77 |

TABLE 11

Test in an acrylic dispersion (aqueous)

Lacquer system: acrylate dispersion (MB 2399-134), aqueous, from the Rohm and Haas company
Comparison product: AQ 75 N

| Product name | Weight added g | Grindometer μm | Densitometer value | Gloss 60° | Gloss 85° | Sheen |
|---|---|---|---|---|---|---|
| TS 100 (Commercial product from Degussa AG) | 0.25 | 41 | 2.5 | 69.3 | 92.3 | 23.0 |
| TS 100 (Commercial product from Degussa AG) | 0.5 | 41 | 2.4 | 56.1 | 87.0 | 30.9 |
| TS 100 (Commercial product from Degussa AG) | 0.75 | 41 | 2.28 | 44.7 | 82.0 | 37.3 |
| TS 100 (Commercial product from Degussa AG) | 1 | 41 | 2.17 | 30.4 | 73.4 | 43.0 |
| Precipitated silica according to example 1b | 1 | 29 | 2.09 | 31.3 | 53.8 | 22.5 |
| AQ 75 N (Commercial product from Crosfield) | 1 | 28 | 1.95 | 39.0 | 68.2 | 29.2 |
| Precipitated silica according to example 1b | 1.5 | 29 | 1.89 | 18.1 | 35.2 | 17.1 |
| TS 100 (Commercial product from Degussa AG) | 1.5 | 41 | 1.82 | 18.7 | 59.5 | 40.8 |

TABLE 11-continued

Test in an acrylic dispersion (aqueous)

Lacquer system: acrylate dispersion (MB 2399-134), aqueous, from the Rohm and Haas company
Comparison product: AQ 75 N

| Product name | Weight added g | Grindometer μm | Densitometer value | Gloss 60° | Gloss 85° | Sheen |
|---|---|---|---|---|---|---|
| AQ 75 N (Commercial product from Crosfield) | 1.5 | 28 | 1.91 | 31.9 | 61.0 | 29.1 |
| Precipitated silica according to example 1b | 2 | 29 | 1.79 | 12.4 | 25.2 | 12.8 |
| TS 100 (Commercial product from Degussa AG) | 2 | 41 | 1.8 | 15.3 | 66.0 | 50.7 |
| AQ 75 N (Commercial product from Crosfield) | 2 | 28 | 1.89 | 27.7 | 53.3 | 25.6 |
| AQ 75 N (Commercial product from Crosfield) | 2.5 | 28 | 1.87 | 21.3 | 51.5 | 30.2 |
| AQ 75 N (Commercial product from Crosfield) | 4 | 28 | — | 12.2 | 358 | 23.6 |

Particle sizes are determined using a laser beam diffractometer from the Malvern company. Before the measurement, the silica is dispersed in water using a stirrer and ultrasound. This silica dispersion is then pumped round the instrument into the path of the beam using a pump.

Sheen is the difference in the degree of gloss measured at an angle of 85° and the degree of gloss measured at an angle of 60°.

The viscosity is determined using a 4 mm DIN cup. The flow time in seconds of the lacquer is measured in accordance with DIN 53 211.

| Key to the abbreviations: | |
|---|---|
| CC lacquer: | coil coating lacquer |
| DD lacquer: | Desmodur Desmophen lacquer Desmodur is a hardener based on isocyanates Desmophen is a polyalcohol, used as the binder component Desmodur/Desmophen are the registered trade names of Bayer AG |
| CAB | cellulose acetobutyrate |
| A/M | alkyd/melamine lacquer |

Example 8
Coating with Polyethylene Wax Emulsion

Precipitated silica is prepared according to DE-OS 31 44 299, Example 1. A wax emulsion (5% wax with respect to silica) is added to the filter cake which has been liquefied under the action of shear forces (solids content 10.8 wt. %) and then stirred vigorously for a further 30 minutes. The wax emulsion is prepared in an autoclave which is steam-heatable and has a disperser. 4.8 parts by weight of an alkylpolyglycol ether (Marlowet® CFW) in 81.0 parts by weight of water at about 100°C. is initially introduced. Then 14.2 parts by weight of low pressure polyethylene wax are added and heated to 130°C. On reaching 130°C., the disperser is switched on and dispersion takes place for 30 minutes. During this time the temperature is held at between 130°C. and 140° C. After switching off the disperser and cooling to about 110° C., the final emulsion is discharged.

The polyethylene used is characterized by the following properties:

| | |
|---|---|
| Average molecular weight | 1000 |
| Solidifying point | 100–104° C. |
| Dropping point | 110–117° C. |
| Density (g/cm$^3$) | 0.93 |

The silica suspension coated with wax in this way is then dried in a rapid dryer (e.g. a spray drier) by atomizing (e.g. two-fluid nozzle, 2.8 bar of atmospheric air). The dried product is milled in a mechanical classifier mill of the ZPS 50 type from the Alpine company. The physico-chemical data are given in table 12:

TABLE 12

| | 8a | 8b |
|---|---|---|
| N$_2$ surface area m$^2$/g | 373 | 373 |
| CTAB-surface area m$^2$/g | 333 | 333 |
| DBP absorption g/100 g | 330 | 330 |
| C content % | 3.4 | 3.4 |
| PH | 7.2 | 7.2 |
| Compacted density g/l | 106 | 87 |
| Particle size distribution (Malvern) in μm | | |
| d$_{90}$ | 26.25 | 12.28 |
| d$_{50}$ | 14.85 | 8.21 |
| d$_{10}$ | 6.91 | 4.66 |

TABLE 13

Alkyl melamine lacquer

| | | | Comparative Example*) | |
|---|---|---|---|---|
| | 8a | 8b | OK 500 | OK 520 |
| Flow time in DIN - seconds at 23° C. | 31 | 29 | 30 | 32 |
| Grindometer value μm | 41 | 26 | 25 | 28 |
| Thickness μm | 30 | 29 | 29 | 28 |
| 60°-Reflectometer value (DIN 67530) | 11.0 | 17.3 | 19.0 | 21.0 |
| 85°-Reflectometer value (DIN 67530) | 24.3 | 42.9 | 69.5 | 76.9 |
| Sheen | 13.3 | 25.6 | 50.5 | 55.9 |

*)Degussa commercial product

TABLE 14

DD lacquer

| | 8a | 8b | Comparative example*) | |
|---|---|---|---|---|
| | | | OK 500 | OK 520 |
| Flow time in DIN - seconds at 23° C. | 23 | 27 | 29 | 30 |
| Weight of matting agent added (g) | 8.5 | 8.5 | 8.5 | 8.5 |
| 60°-Reflectometer value (DIN 67530) | 21.6 | 34.4 | 69.9 | 8.6 |
| 85°-Reflectometer value (DIN 67530) | 33.2 | 67.4 | 88.2 | 32.5 |
| Sheen | 11.6 | 33.0 | 18.3 | 23.9 |
| Densitometer value - Macbeth RD 918 measured using yellow filter | 2.12 | 2.32 | 2.31 | 1.69 |

*)Degussa commercial product

While the invention has be described above with respect to certain embodiments thereof, variations and modifications may be made without departing from the spirit and scope of the invention.

What is claimed is:

1. A precipitated silica matting agent comprising the following physico-chemical parameters:

| | |
|---|---|
| BET surface area (DIN 66131) in m$^2$/g | 400–600 |
| DBP index (DIN 53601) as a % | 300–360 |
| Compacted density (DIN 53194) in g/l | 70–140 |
| Grindometer value (ISO 1524) in µm | 23–39 |
| d$_{10}$ value | 3.74–5.76 |
| Size distribution index I | 0.5–0.597 |

Measured with a Malvern instrument, wherein

Size distribution index $$I = \frac{d_{90} - d_{10}}{2d_{50}}.$$

2. A process for preparing a precipitated silica matting agent with the physico-chemical parameters:

| | |
|---|---|
| BET surface area (DIN 66131) in m$^2$/g | 400–600 |
| DBP index (DIN 53601) as a % | 300–360 |
| Compacted density (DIN 53194) in g/l | 70–140 |
| Grindometer value (ISO 1524) in µm | 23–39 |
| d$_{10}$ value | 3.74–5.76 |
| Size distribution index I | 0.5–0.597 |

Measured with a Malvern instrument, wherein

Size distribution index $$I = \frac{d_{90} - d_{10}}{2d_{50}}$$

according to claim 1 comprising:

milling a precipitated silica which has the following physico-chemical characteristics:

| | |
|---|---|
| BET surface area (DIN 66131) in m$^2$/g | 400–600 |
| DBP index (DIN 53601) as a % | 340–380 |
| Compacted density (DIN 53194) in g/l | 180–220 |
| "Alpine" sieve residue > 63 µm wt. % | 25–60 | using a classifier mill or a fluidized bed counter-flow mill.

3. A process for using the precipitated silica according to claim 1, comprising:

adding the precipitated silica to a lacquer system as a matting agent.

* * * * *